(12) United States Patent
Schuster

(10) Patent No.: US 9,718,520 B2
(45) Date of Patent: Aug. 1, 2017

(54) LOADING ARRANGEMENT FOR SHIPS

(71) Applicant: SCHUSTER ENGINEERING GMBH, Erkheim (DE)

(72) Inventor: Thomas Schuster, Kammlach (DE)

( * ) Notice: Subject to any disclaimer, the term of this patent is extended or adjusted under 35 U.S.C. 154(b) by 0 days.

(21) Appl. No.: 14/412,983

(22) PCT Filed: Jul. 3, 2013

(86) PCT No.: PCT/EP2013/001951
§ 371 (c)(1),
(2) Date: Nov. 2, 2015

(87) PCT Pub. No.: WO2014/005704
PCT Pub. Date: Jan. 9, 2014

(65) Prior Publication Data
US 2016/0046353 A1 Feb. 18, 2016

(30) Foreign Application Priority Data

Jul. 3, 2012 (DE) .................. 20 2012 006 349 U

(51) Int. Cl.
| | |
|---|---|
| *B60P 7/08* | (2006.01) |
| *B63B 27/10* | (2006.01) |
| *B60P 7/12* | (2006.01) |
| *B63B 25/24* | (2006.01) |
| *B63B 25/22* | (2006.01) |
| *B63B 25/02* | (2006.01) |
| *B63B 27/30* | (2006.01) |
| *B65G 69/02* | (2006.01) |

(52) U.S. Cl.
CPC .............. *B63B 27/10* (2013.01); *B60P 7/12* (2013.01); *B63B 25/02* (2013.01); *B63B 25/22* (2013.01); *B63B 25/24* (2013.01); *B63B 27/30* (2013.01); *B65G 69/02* (2013.01)

(58) Field of Classification Search
CPC ......... B63B 27/10; B63B 27/30; B63B 25/02; B63B 25/22; B63B 25/24; B65G 69/02; B60P 7/12
USPC ....... 410/31–33, 35, 36, 40, 42, 46, 47, 155; 220/1.5; 114/381; 206/446, 504, 83.5; 53/543

See application file for complete search history.

(56) References Cited

U.S. PATENT DOCUMENTS 8,534,970 B2 * 9/2013 Salo ....................... B60P 7/065
410/155

FOREIGN PATENT DOCUMENTS

DE     20 2010 003 363 U1    7/2010

* cited by examiner

*Primary Examiner* — Stephen Gordon
(74) *Attorney, Agent, or Firm* — Michele V. Frank; Venable LLP

(57) ABSTRACT

The invention relates to a loading arrangement for ships including a plurality of bales, in particular packaged garbage round bales that are stacked in a hull and that can be loaded and/or unloaded by a crane and/or a transfer device, preferably with gripper tongs for gripping two bales at once in each case. For the gentle unloading and secure gripping of the bales, according to the invention the bales are stacked in multiple transverse rows (5), in particular dual rows, between which in each case a bale stack (6) is arranged that is oriented in a right angled horizontally twisted manner.

7 Claims, 2 Drawing Sheets

LOADING ARRANGEMENT FOR SHIPS

The invention relates to a ship loading arrangement for bales, especially packaged waste (garbage) bales.

Such garbage round bales or "fuel" bales as well as harvested crops or bales of renewable raw materials are often transported with cargo ships over long distances. The bales are stacked in a mostly open hull with a harbor crane next to each other. Beside a standing arrangement of the bales (the central axis of the round bale is vertical) often a horizontal loading is performed, since this allows simultaneous gripping of a plurality of bales on their end faces with tongs in the manner of a modified timber gripper. In general, two bales coaxially one behind the other are pressed against each other, so that such dual bales can be accurately placed in adjacent rows in the ship. As to round bales, the individual layers are offset by half the diameter, so that the bales are located in the valley of the bales below. This allows stacking of e.g. ten layers, being in a relatively stable position even in rough seas.

Unloading is performed with a gripper or crane, such that two (or more) bales are grasped and transported simultaneously for a rapid discharge and reducing the harbouring time of the ship. However, immersion of the grippers into the narrow bale stacks is difficult, despite a slim design of the tongs, since the bales are close to each other and the wrapping foil of the wrapped bale can be damaged. This causes dirt and considerable loss of time by the thus required cleaning. Even applying of rollers or similar elements to reduce friction on the outer sides of the gripper tongs can hardly reduce damaging the bales during immersion, especially at the top of a bale layer.

Thus, the invention aims to provide a ship loading arrangement for bales enabling a smooth and safe gripping.

In the now proposed loading arrangement comprising a plurality of bales, especially packaged garbage round bales, the bales are stacked in multiple transverse rows, especially in dual rows in the hull, between each of which a bale stack is arranged in a right angled horizontally twisted manner. Preferably, this bale stack is formed of stacked bales in single or double configuration. The change in orientation (e.g. two longitudinal/one or two transverse to the ship axis), allows gripping of the bales without substantial frictional contact so that damage is virtually eliminated. Access can also be improved in that the bale stacks in the transverse direction of the hull have a front gap thereto following each two bales. As this distance is only about 5% of the bale width, the cargo space loss is minimal because the bales are stacked in multiple transverse rows with the maximum packing density.

Since the bale stacks and the double transverse rows are offset in each layer by half their diameter, this ship loading arrangement provides a mutual support of bales against each other, and thus stability of the cargo results even in heavy seas. This also facilitates the quick and clean unloading at the port of destination. In order to adapt to the change in the orientation of the bale axes quickly, the gripper jaws or tongs are pre-positioned relative to the main direction of the handling equipment (f. i. a boom discharger) or crane, f. i. at 90° with corresponding rotational stops so that the discharger or crane operator is relieved in his work, as paying attention to the orientation of the gripper tongs in respect to the bale position is not required. Positioning of the gripper tongs can also be facilitated by sensors for the position and orientation of the grasping forceps at the bale, as monitored by ultrasound or laser scanning.

Hereinafter, a preferred embodiment is described with reference to the drawings.

Figure 2:
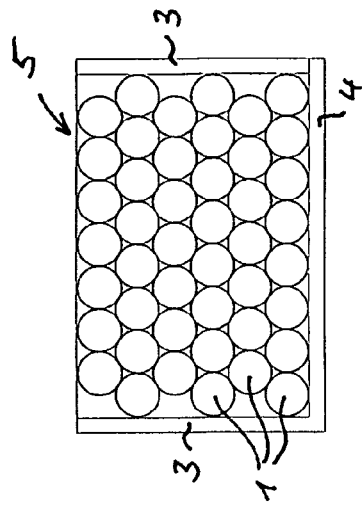
FIG. 2 is a cross-sectional view through the hull.
Figure 1:
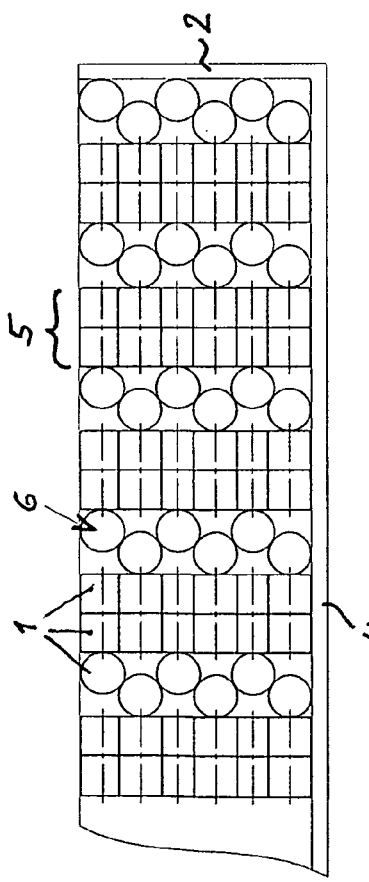
FIG. 1 is a side view of a ship loading arrangement.

FIG. 1 shows an embodiment of a loading arrangement comprising a plurality of bales 1, in particular packaged waste-round bales, which are stacked in a ship's hull 2. The hull 2 has a conventionally flat bottom 4 and sidewalls 3 (cf. FIGS. 2 and 3), which may also have additional bulkheads. The bales 1 are here stacked in multiple transverse rows 5, especially in dual rows, and between each dual row 5 a bale stack 6 is arranged, being horizontally twisted. In the preferred embodiment as round bales, the dual rows 5 are offset layer-by-layer by half the diameter, as shown in FIG. 2, such that the packing density is high.

Figure 4:
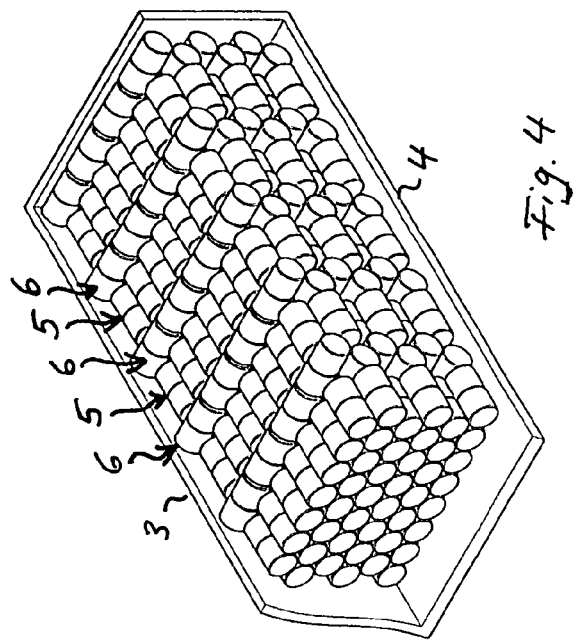
FIG. 4 is a perspective view of the embodiment according to FIGS. 1 to 3.
Figure 3:
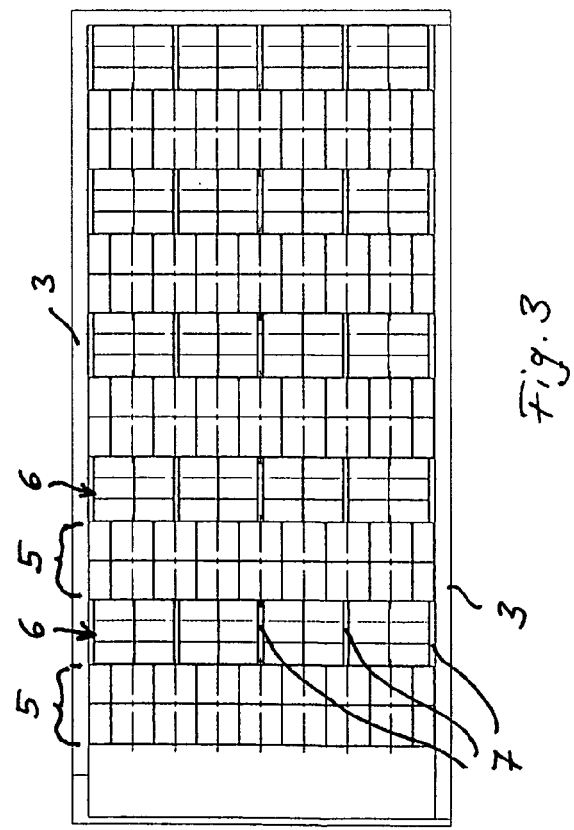
FIG. 3 is a plan view of the laden ship.

The top view in FIG. 3 shows the ship's cargo arrangement with alternating stacks of dual rows 5 and bale stacks 6, as can be seen in perspective view in FIG. 4, too. In addition, as to the bale stack 6, it is shown, that a gap 7 is provided between two bales, each in the transverse direction of the hull 2 towards the sidewalls 3. As a result, gripper tongs 8 (cf. FIG. 5) immerse in that gap 7 and grab at least one bale 1 of the bale stack 6 to lift it out of the uppermost layer. This gap 7 is only about 5% of the bale width (in ship transverse direction), so that the overall density of the cargo is hardly reduced and mutual support of the bales is achieved.

Figure 5:
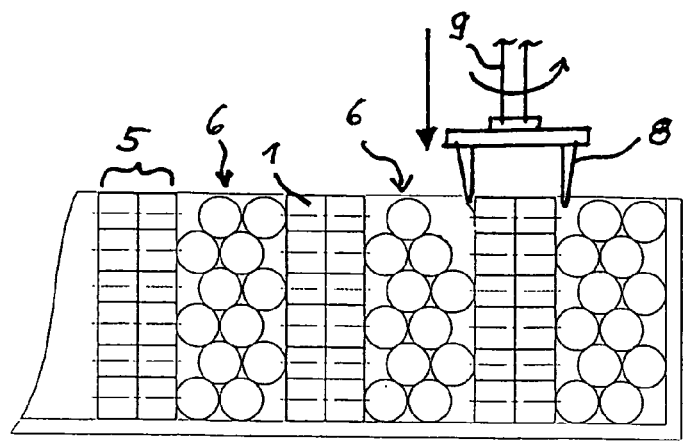
FIG. 5 is a side view of a modified ship loading arrangement.
Figure 6:
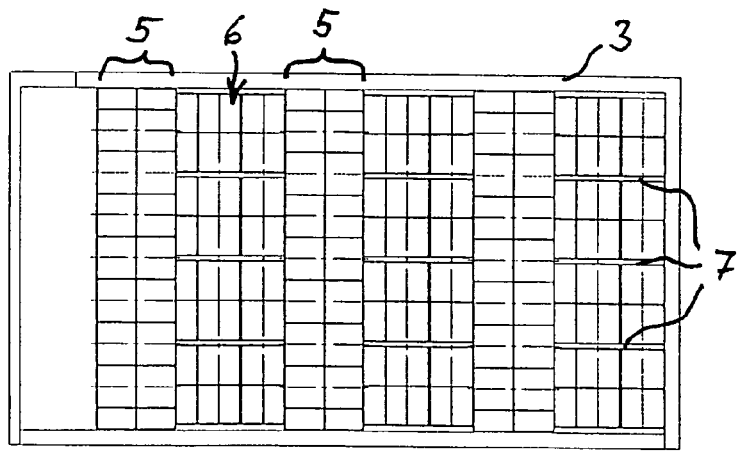
FIG. 6 is a plan view to the embodiment of FIG. 5.
Figure 7:
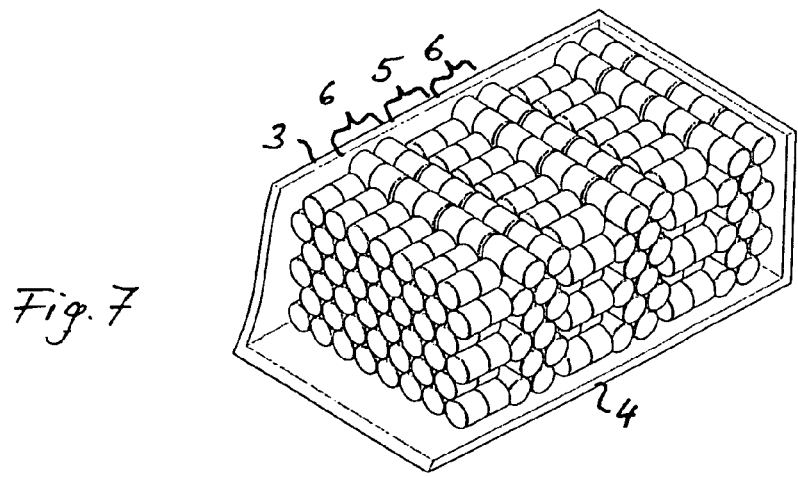
FIG. 7 is a perspective view of FIG. 5 and FIG. 6.

This is especially true for the dual arrangement of the bale stack 6, shown in FIG. 5, while in FIGS. 1 to 4 the bales 1 are individually stacked and transversely aligned to the ship's axis 1 (with virtually any bale size). Thus, according to FIGS. 5 to 7, the gripping tongs 8 can pick two bales 1, both from the bale stack 6 and from the double or multiple-transverse rows 5. For this purpose, the gripper tongs 8 of a rudimentary indicated handling device 9 are pivoted into a horizontal plane by 90°, preferably against stoppers for aligning the gripper tongs 8 to match the bale position. As can be seen from FIG. 5, right-hand stack assembly, the gripper tongs 8 can be freely lowered at the front of the topside bale 1 while on the left side at least one bale 1 is taken from the top layer of the bale stack 6, so that the left jaw can be lowered without hindrance. After descent of the gripper tongs 8 to the lower region of the bale layer a dual bale can thus be safely removed from the double transverse row 5 without damage. It is recommended that first the uppermost layer of the bale stack 6 is unloaded over the entire ship to ensure that the gripper forceps 8 is pivoted as little as possible.

The loading arrangement described thus allows a gentle and fast unloading of the ship, preferably always two (or more) bales are picked-up by the gripper tongs 8. To switch between the bale layers the gripper tongs 8 can be pivoted relative to the main unloading direction of the crane 9 or handling equipment by 90°. In this case, several bales can be removed from the bale stack 6, before bales 1, again preferably in pairs, are unloaded from the multi-transverse rows 5. The loading of the ship is carried out in an analogous manner, so that pivoting of the gripper tongs 8 by 90° in the horizontal plane are not too frequent. Further, the gripper tongs 8 can be equipped with positioning aids such as a laser, particularly for exactly reproducible positioning for each bale position.

The invention claimed is:

1. A loading arrangement for ships, the loading arrangement comprising:
   a plurality of bales, which are packaged garbage round bales, that are stacked in a hull of a ship and that are stacked such that the plurality of bales can be loaded and/or unloaded by means of a crane and/or a handling device with gripper tongs of the crane or handling device for gripping two bales of the plurality of bales simultaneously,
   wherein the plurality of bales comprises bales stacked in multiple transverse rows and bale stacks, the multiple transverse rows including dual rows of bales, and between each of the dual rows of bales one of the bale stacks is arranged, the bale stacks each comprising bales of the plurality of bales that are rotated horizontally 90° with respect to bales of the multiple transverse rows, and
   wherein the bale stacks each comprise sets of two bales aligned in the transverse direction of the hull toward sidewalls of the hull, with an end-face gap separating each of the sets of two bales from one of the sets of two bales that is adjacent in the transverse direction.

2. The loading arrangement according to claim 1, wherein the bale stacks are each formed of stacked bales in single, double or multiple arrangement.

3. The loading arrangement according to claim 1, wherein the gap is about 5% to 10% of a bale width, the bale width being a distance between two circular end faces of one of the plurality of bales.

4. The loading arrangement according to claim 1, wherein the bale stacks and/or the multiple transverse rows each have offset layers.

5. The loading arrangement according to claim 4, wherein each of the offset layers are offset from adjacent offset layers by half a diameter of one of the plurality of bales.

6. The loading arrangement according to claim 1, wherein the plurality of bales are arranged such that, for unloading operation of the plurality of bales, a top layer of at least one of the bale stacks is removed first.

7. The loading arrangement according to claim 1, wherein the plurality of bales are arranged to allow the gripper tongs to be pre-positioned by 90° to a main loading or unloading direction of the handling device or crane.

* * * * *